United States Patent
Ohlhafer et al.

(10) Patent No.: US 12,104,700 B2
(45) Date of Patent: Oct. 1, 2024

(54) SHUT-OFF VALVE FOR A PRESSURIZED-GAS VESSEL, PRESSURIZED-GAS VESSEL

(71) Applicant: Robert Bosch GmbH, Stuttgart (DE)

(72) Inventors: Olaf Ohlhafer, Erligheim (DE); Bernd Stuke, Leonberg (DE); Hans-Arndt Freudigmann, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 17/928,014

(22) PCT Filed: Apr. 14, 2021

(86) PCT No.: PCT/EP2021/059664
§ 371 (c)(1),
(2) Date: Nov. 28, 2022

(87) PCT Pub. No.: WO2021/239320
PCT Pub. Date: Dec. 2, 2021

(65) Prior Publication Data
US 2023/0213098 A1    Jul. 6, 2023

(30) Foreign Application Priority Data
May 28, 2020   (DE) ..................... 10 2020 206 678.7

(51) Int. Cl.
*F16K 1/30*      (2006.01)
*F16K 31/00*     (2006.01)
(Continued)

(52) U.S. Cl.
CPC ............ *F16K 1/303* (2013.01); *F16K 31/007* (2013.01); *F16K 31/0655* (2013.01);
(Continued)

(58) Field of Classification Search
CPC .... F16K 1/303; F16K 31/007; F16K 31/0655; F16K 31/0679; F16K 31/082;
(Continued)

(56) References Cited

U.S. PATENT DOCUMENTS 3,203,447 A  *  8/1965  Bremner ............. F16K 31/0627
                                                          335/229
4,531,706 A  *  7/1985  Weiger .................. F15B 21/001
                                                          251/30.05
(Continued)

FOREIGN PATENT DOCUMENTS

EP    3020680 A1   5/2016
WO    9961828 A1   12/1999

OTHER PUBLICATIONS

Translation of International Search Report for Application No. PCT/EP2021/059664 dated Aug. 3, 2021 (2 pages).

*Primary Examiner* — John Bastianelli
(74) *Attorney, Agent, or Firm* — Michael Best & Friedrich LLP

(57) ABSTRACT

A shut-off valve for a pressurized-gas vessel includes a valve closing body which can perform stroke movements and is preloaded by the spring force of a closing spring against a valve seat. When the valve closing body is in a closed position, a connection of a valve inlet to a valve outlet is shut off. The shut-off valve includes an actuator arrangement for opening the valve closing body. The actuator arrangement interacts with an actuating element which is arranged spaced apart from and coaxial with respect to the valve closing body and which is movable by the actuator arrangement in the direction of the valve closing body. When the actuating element abuts against the valve closing body, an opening impulse can be generated.

15 Claims, 3 Drawing Sheets

(51) Int. Cl.
*F16K 31/06* (2006.01)
*F16K 31/08* (2006.01)
*F17C 13/04* (2006.01)

(52) U.S. Cl.
CPC ........ *F16K 31/0679* (2013.01); *F16K 31/082* (2013.01); *F17C 13/04* (2013.01); *F17C 2205/0326* (2013.01); *F17C 2205/0382* (2013.01); *F17C 2205/0394* (2013.01); *F17C 2221/012* (2013.01); *F17C 2223/0123* (2013.01); *F17C 2223/036* (2013.01); *F17C 2270/0178* (2013.01); *F17C 2270/0184* (2013.01)

(58) Field of Classification Search
CPC .............. F17C 13/04; F17C 2205/0326; F17C 2205/0382; F17C 2205/0394; F17C 2221/012; F17C 2223/0123; F17C 2223/036; F17C 2270/0178; F17C 2270/0184

USPC ........................................... 251/76, 117, 284
See application file for complete search history.

(56) References Cited

U.S. PATENT DOCUMENTS

| | | | |
|---|---|---|---|
| 6,000,417 A * | 12/1999 | Jacobs | F16K 31/084 137/239 |
| 6,213,446 B1 * | 4/2001 | Dismon | F02M 26/50 123/568.21 |
| 7,730,905 B2 * | 6/2010 | Suzuki | F17C 13/04 251/30.03 |
| 2004/0045539 A1 * | 3/2004 | Furuta | F16K 31/0679 123/529 |
| 2004/0051073 A1 | 3/2004 | Estrems | |
| 2009/0236551 A1 | 9/2009 | Nomichi et al. | |
| 2018/0038507 A1 * | 2/2018 | Ninomiya | F02M 21/0233 |

* cited by examiner

SHUT-OFF VALVE FOR A PRESSURIZED-GAS VESSEL, PRESSURIZED-GAS VESSEL

BACKGROUND OF THE INVENTION

The invention relates to a shut-off valve for a pressurized-gas vessel. The invention furthermore relates to a pressurized-gas vessel having such a shut-off valve. In particular, it should be possible to use the pressurized-gas vessel for storing hydrogen, preferably in mobile applications, for example in fuel cell vehicles.

Fuel cell vehicles require hydrogen and oxygen to operate the fuel cells. While the oxygen can be taken from the ambient air, the hydrogen is generally carried on board the vehicle in pressurized-gas vessels. The pressure in these vessels is usually above 500 bar and will hereinafter be referred to as high pressure.

The removal of hydrogen from a pressurized-gas vessel generally takes place via an electrically controllable shut-off valve of the pressurized-gas vessel. This opens against the high pressure in the pressurized-gas vessel. Since a comparatively large cross section must be opened for the necessary flow, a high initial opening force is required. In the case of an electromagnetically actuated shut-off valve which is switched directly, this means that large magnetic forces must be applied. As an alternative, an indirectly switched shut-off valve can be used, which is switched by means of a pilot valve, for example. By opening an initially small cross section, pressure compensation can be effected, and therefore less force is required for the subsequent full opening of the shut-off valve. However, indirectly switched valves have a significantly more complex structure compared to directly switched valves, and this is reflected in a high number of parts.

SUMMARY OF THE INVENTION

Proceeding from the aforementioned prior art, it is the underlying object of the present invention to specify a shut-off valve for a pressurized-gas vessel which permits high actuating forces for initial opening and at the same time is of simple construction. In addition, a pressurized-gas vessel having such a shut-off valve is specified.

The shut-off valve proposed for a pressurized-gas vessel comprises a valve closing body which can perform stroke movements and which is preloaded against a valve seat by the spring force of a closing spring, with the result that, when the valve closing body is in a closed position, a connection of a valve inlet to a valve outlet is shut off. The shut-off valve further comprises an actuator arrangement for opening the valve closing body. According to the invention, the actuator arrangement interacts with an actuating element which is arranged at a distance from and coaxially with the valve closing body and which can be moved in the direction of the valve closing body by means of the actuator arrangement, such that, when the actuating element strikes the valve closing body, an opening momentum can be generated.

The proposed shut-off valve is accordingly switched directly with the aid of the actuator arrangement and the actuating element. The initially high opening force in the case of a directly switched valve is brought about in the case of the proposed shut-off valve by a momentum which results from the movement of the actuating element. This is because the kinetic energy of the actuating element is converted, upon impact with the valve closing body, into a force which lifts the valve closing body out of the valve seat against high pressure. Since pressure compensation occurs after the initial opening, full opening can then be brought about with significantly reduced force.

The movement of the actuating element necessary to generate the opening momentum can be brought about with comparatively low actuating forces, and therefore the actuator arrangement can be correspondingly small. At the same time, the number of parts decreases since the proposed shut-off valve is switched directly.

As a further development of the invention, it is proposed that the actuator arrangement and/or the actuating element are/is preloaded by the spring force of a return spring. The spring force of the return spring acts counter to the direction of force of the actuator arrangement. By means of the return spring, the necessary reset can thus be brought about. This is because, to enable the actuating element to be set in motion by means of the actuator arrangement and to enable the actuating element to absorb sufficient kinetic energy, a predetermined distance must be maintained between the valve closing body and the actuating element in the closed position of the shut-off valve.

The actuator arrangement and the actuating element are preferably coupled or at least can be coupled, and therefore, when one component is preloaded, the respective other component is likewise preloaded or can be reset by means of the return spring.

The actuator arrangement preferably comprises a linearly acting actuator, for example a magnet, piezoelectric or eddy current actuator. The direction of force of the actuator can thus be optimally aligned with the direction of movement of the actuating element. Irrespective of the type of actuator, it can have a "repelling" or "attractive" effect on the actuating element. The type of action in turn determines whether the actuator is arranged in front of or behind the actuating element. For example, the actuator can have a repelling effect. In this case, the actuator is arranged behind the actuating element, i.e. on the side of the actuating element facing away from the valve closing body.

In particular, the actuating element can be a type of tappet with a body which is elongate, at least in some section or sections. In the event that the actuator has a repelling effect, it is proposed that the actuating element is a push rod.

As an alternative or in addition, it is proposed that the actuating element is manufactured from a magnetic material at least in some region or regions or in part. This allows the use of a magnetic actuator. By means of a magnetic actuator, either a repelling or an attractive effect can be exerted on the actuating element. The actuating element can be, for example, a permanent magnet or comprise such a magnet.

The actuator arrangement preferably comprises an actuator chamber for accommodating the actuator. the return spring can also be arranged in the actuator chamber. In order to avoid contact of the actuator with the pressurized gas, the actuator chamber can be sealed with respect to a region of the shut-off valve which carries pressurized gas and can be vented via a venting channel. In particular, sealing can be implemented in the region of a guide of the actuating element. The volume or pressure compensation required for the movement of the actuating element can be effected via the venting channel. Via the venting channel, it is furthermore possible to discharge pressurized gas which gets into the actuator chamber by way of leakage. Alternatively, however, the actuator chamber can also be connected to a region of the shut-off valve which carries pressurized gas. In this case, sealing measures are unnecessary.

The opening stroke of the valve closing body is preferably limited by a stop. The stop defines an end position of the valve closing body. In this end position, the opening cross section of the shut-off valve is preferably at a maximum. Furthermore, an electromagnet, by means of which the valve closing body can be held in the open position, is preferably arranged in the region of the stop. By means of the magnetic force of the electromagnet, it is thus possible to overcome the spring force of the closing spring which preloads the valve closing body in the direction of the valve seat. Since the required holding forces are comparatively low, a correspondingly small electromagnet can be used.

According to a preferred embodiment of the invention, the valve closing body and/or the valve seat are/is of conical design, at least in some section or sections. In this way, self-centering of the valve closing body with respect to the valve seat is brought about during closing, ensuring that the shut-off valve closes tightly.

As an alternative or in addition, the valve closing body can be guided by means of the closing spring and/or a guide cage. The guidance of the valve closing body ensures optimum alignment of the valve closing body with respect to the valve seat and thus tight closing of the shut-off valve.

In the preferred use as a shut-off valve of a pressurized-gas vessel, the proposed shut-off valve is arranged in such a way that the valve inlet is connected or can be connected to the pressurized-gas vessel. High pressure thus prevails in the valve inlet of the shut-off valve. This means that the shut-off valve opens against high pressure. In this embodiment, the advantages of the invention are brought to bear in an optimum manner.

In addition, a pressurized-gas vessel having a shut-off valve according to the invention is proposed. The advantages of the shut-off valve also extend to the pressurized-gas vessel. The pressurized-gas vessel can be used, for example, for storing hydrogen, so that the problems described at the outset can be solved with the aid of the pressurized-gas vessel or with the aid of the shutoff valve of the pressurized-gas vessel.

BRIEF DESCRIPTION OF THE DRAWINGS

A preferred embodiment of the invention is explained in greater detail below with reference to the appended drawings. More specifically.

DETAILED DESCRIPTION

Figure 1:
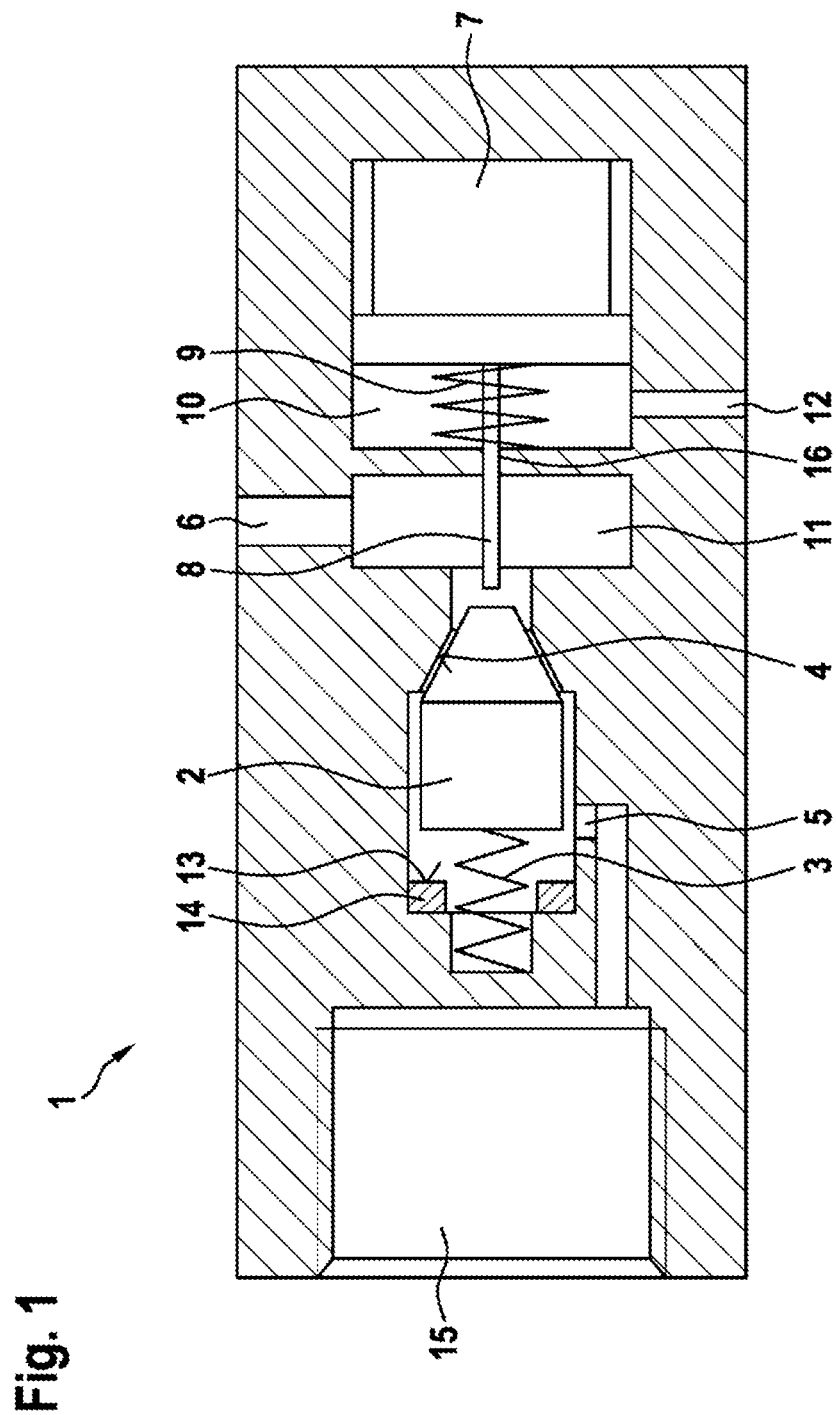
FIG. 1 shows a schematic longitudinal section through a shut-off valve according to the invention in the closed position.
Figure 2:
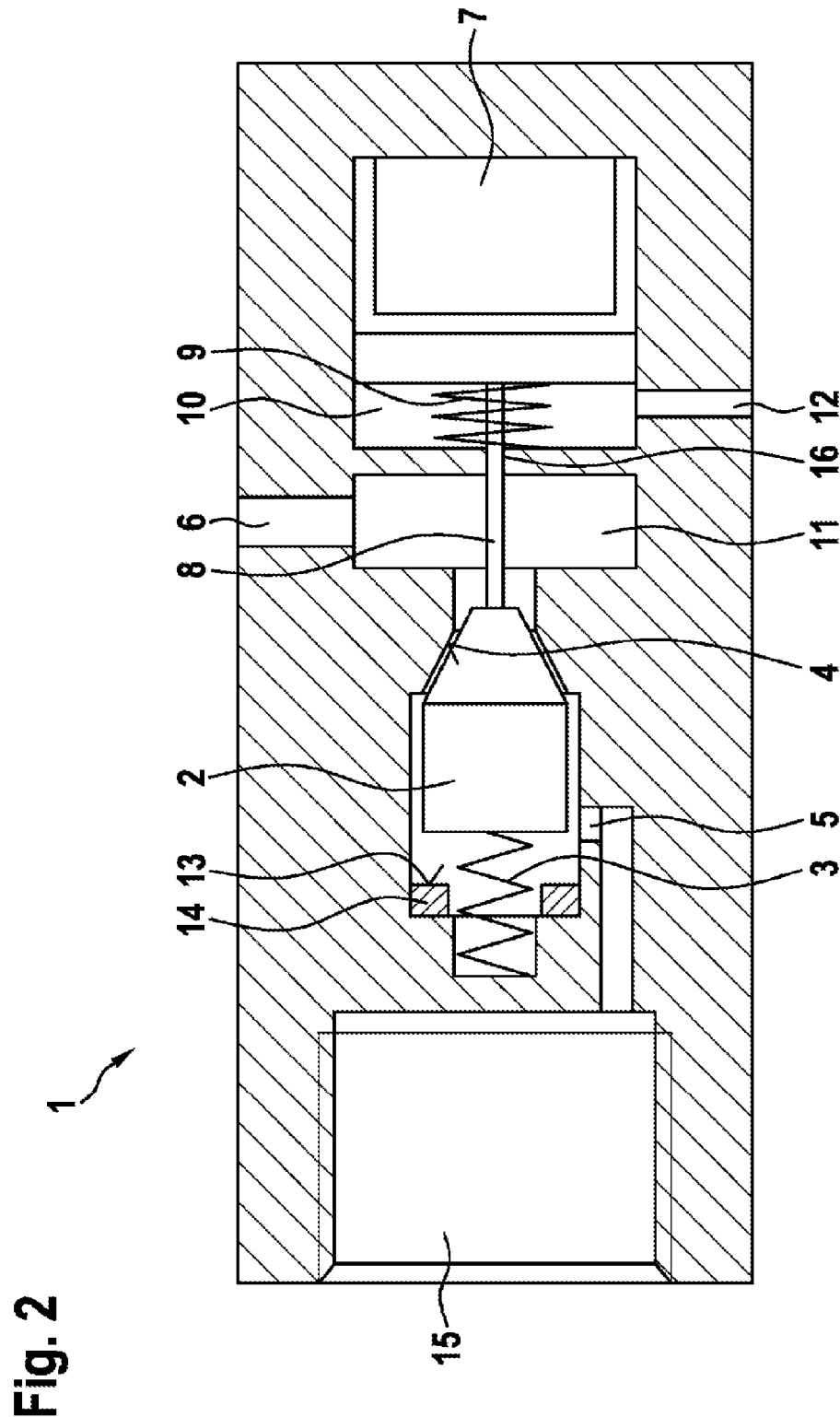
FIG. 2 shows a schematic longitudinal section through the shut-off valve of FIG. 1 when the actuator is activated.
Figure 3:
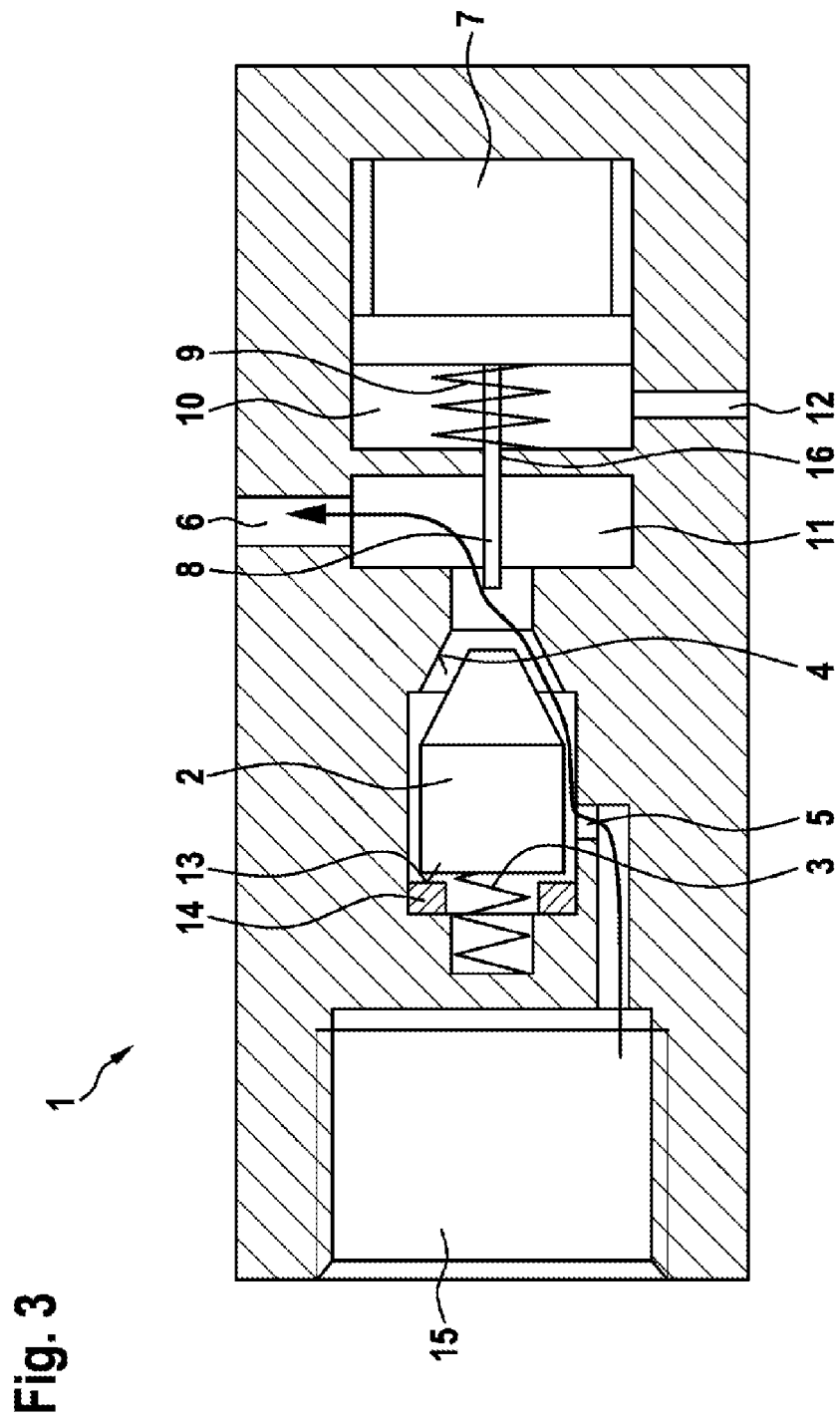
FIG. 3 shows a schematic longitudinal section through the shut-off valve of FIG. 1 in the open position.

The shut-off valve 1 illustrated in FIGS. 1 to 3 has a valve closing body 2 which can be moved back and forth between a valve seat 4 and a stop 13. By means of the spring force of a closing spring 3, the valve closing body 2 is preloaded against the valve seat 4. In the open position of the valve closing body 2, a connection is made between a valve inlet 5 and a valve outlet 6. The valve inlet 5 has a connection to a high-pressure connection 15, via which the shut-off valve 1 is connected or can be connected to a pressurized-gas vessel (not illustrated).

In addition, the shut-off valve 1 shown has an actuator arrangement 7, which interacts with an actuating element 8. In the closed position of the shut-off valve 1 and when the actuator arrangement 7 is deenergized, this actuating element is arranged at a distance from and coaxially with the valve closing body 2 (see FIG. 1). The actuator arrangement 7 is arranged behind the actuating element 8. If current is supplied to an actuator of the actuator arrangement 7, the actuator forces move the actuating element 8 in the direction of the valve closing body 2 (see FIG. 2). During this process, the actuating element 8 absorbs kinetic energy which, on impact with the valve closing body 2, is converted into an opening momentum which leads to the valve closing body 2 being lifted out of the valve seat 4 counter to the spring force of the closing spring 3 and counter to high pressure. During this process, a first opening cross section is exposed, which leads to the pressure downstream of the valve seat 4 adjusting to the pressure upstream. As a result of the remaining kinetic energy introduced into the valve closing body 2 by way of the momentum, the latter moves further in the direction of the stop 13. When the stop 13 is reached, current is supplied to an electromagnet 14, which forms the stop 13 and whose magnetic force holds the valve closing body 2 in this end position (see FIG. 3). The valve closing body 2 now exposes the maximum opening cross section of the shut-off valve 1. At this point in time, the actuating element 8 has already reassumed its initial position since the energization of the actuator has been ended, with the result that a return spring 9 was able to reset the actuating element 8.

To close the shut-off valve 1, the energization of the electromagnet 14 is ended and, as a result, the closing spring 3 returns the valve closing body 2 to the valve seat 4. The shut-off valve 1 is then once again in the state illustrated in FIG. 1.

In the exemplary embodiment illustrated in FIGS. 1 to 3, the actuator of the actuator arrangement 7 and the return spring 9 are arranged in an actuator chamber 10 which is sealed with respect to a region 11 which carries pressurized gas. This means that the actuator does not come into contact with the pressurized gas. The sealing is effected by means of a guide 16 of the actuating element 8. A venting channel 12 is provided for venting the actuator chamber 10.

What is claimed is:

1. A shut-off valve (1) for a pressurized-gas vessel, the shut-off valve (1) comprising a valve closing body (2) which is configured to perform stroke movements and which is preloaded against a valve seat (4) by a spring force of a closing spring (3), with a result that, when the valve closing body (2) is in a closed position, a connection of a valve inlet (5) to a valve outlet (6) is shut off, and furthermore comprising an actuator arrangement (7) for opening the valve closing body (2), wherein the actuator arrangement (7) interacts with an actuating element (8) which is arranged at a distance from and coaxially with the valve closing body (2) and which is configured to be moved in a direction of the valve closing body (2) by the actuator arrangement (7), such that, when the actuating element (8) strikes the valve closing body (2), an opening momentum is generated, wherein an opening stroke of the valve closing body (2) is limited by a stop (13), and an electromagnet (14) for holding the valve closing body (2) in an open position is arranged in a region of the stop (13), wherein the valve closing body (2) achieves a maximum opening cross section of the shut-off valve (1) when the actuating element (8) has returned to an initial position after energization of the actuator element (8).

2. The shut-off valve (1) as claimed in claim 1, wherein the actuator arrangement (7) comprises a linearly acting actuator.

3. The shut-off valve (1) as claimed in claim 1, wherein the actuating element (8) is a push rod and/or is manufactured from a magnetic material at least in some region or regions or in part.

4. The shut-off valve (1) as claimed in claim 3, wherein the actuating element (8) is manufactured from a magnetic material at least in some region or regions or in part.

5. The shut-off valve (1) as claimed in claim 1, wherein the actuator arrangement (7) comprises an actuator chamber (10) and a venting channel (12), the actuator chamber (10) configured to be vented via the venting channel (12) and the actuator chamber (10) being sealed with respect to a region (11) which carries pressurized gas.

6. The shut-off valve (1) as claimed in claim 1, wherein the valve closing body (2) and/or the valve seat (4) are/is of conical design, at least in some section or sections.

7. The shut-off valve (1) as claimed in claim 1, wherein the valve closing body (2) is guided by the closing spring (3) and/or a guide cage.

8. The shut-off valve (1) as claimed in claim 1, wherein the valve inlet
  (5) is connected or is configured to be connected to the pressurized-gas vessel, with the result that high pressure prevails in the valve inlet (5).

9. A pressurized-gas vessel having the shut-off valve (1) as claimed in claim 1.

10. The shut-off valve (1) as claimed in claim 1, wherein the actuating element (8) is preloaded by the spring force of a return spring (9), wherein the spring force of the return spring (9) acts counter to a direction of force of the actuator arrangement (7).

11. The shut-off valve (1) as claimed in claim 1, wherein the actuator arrangement (7) comprises a linearly acting actuator, which includes a magnet.

12. The shut-off valve (1) as claimed in claim 1, wherein the actuator arrangement (7) comprises a linearly acting actuator, which includes a piezoelectric actuator.

13. The shut-off valve (1) as claimed in claim 1, wherein the actuator arrangement (7) comprises a linearly acting actuator, which includes an eddy current actuator.

14. The shut-off valve (1) as claimed in claim 1, wherein the actuating element (8) is manufactured from a magnetic material at least in some region or regions or in part.

15. The shut-off valve (1) as claimed in claim 1, wherein the actuator arrangement (7) comprises an actuator chamber (10), which is connected to a region (11) which carries pressurized gas.

* * * * *